July 3, 1962 — C. S. CHRISTIANSEN — 3,041,885
BELLOWS
Filed May 11, 1959

INVENTOR.
CLIFFORD S. CHRISTIANSEN
BY
ATTORNEYS

3,041,885
BELLOWS

Clifford S. Christiansen, Port Clinton, Ohio, assignor, by mesne assignments, to Baldwin-Montrose Chemical Company, Incorporated (Baldwin Division) Pontiac, Mich., a corporation of Indiana
Filed May 11, 1959, Ser. No. 812,305
17 Claims. (Cl. 74—18.2)

This invention relates to a seal or boot and refers more specifically to a seal in the form of a bellows including exhaust means therefor to permit rapid operation of the bellows without deforming the bellows and also including filters associated with the exhaust means to prevent foreign matter from entering the bellows through the exhaust means during operation of the bellows.

In industry it is often necessary to make use of mechanical members such as a rod and a piston so related that the rod reciprocates between two relatively fixed positions with respect to a cylinder housing. These mechanical members in devices such as automobiles or the like are quite likely to be located in positions where they are exposed to dirt, grease and other matter harmful to the operation thereof. It is therefore desirable and common practice to place seals around the rods which are attached to the cylinder housing to prevent foreign matter from entering said cylinder housing through the opening therein for said rod or otherwise interfering with the reciprocation of said rod.

In the past seals for these members have taken the form of bellows made of plastic, rubber or other flexible material. However, with fast acting reciprocating rods such as are used in connection with automobile power brakes and the like it has been found that during the retraction of the rods the bellows tend to deform due to the air trapped therein. The problem then confronts industry of how to rapidly exhaust the air from the bellows and draw air back into the bellows during the contraction and expansion thereof respectively in a simple economical manner without allowing foreign matter to collect inside of the bellows. Prior known devices such as screens around the outside of the small diameter of the bellows operative in conjunction with orifices in the small diameter and requiring expansion rings on the interior of adjacent large diameters of the bellows have been complicated, expensive and often unsatisfactory solutions to this problem.

It is therefore one of the objects of the present invention to provide a seal to extend between a reciprocating rod or the like and an opening in which the rod is movable, including air exhaust means therefor and filters associated with said air exhaust means.

Another object is to provide a bellows for sealing a reciprocating rod or the like in an aperture, including air exhaust means therefor having air filters associated therewith and including means to prevent the filters from becoming dislodged during expansion and contraction of the bellows with movement of the rod.

More specifically it is an object to provide a bellows for sealing a reciprocating rod or the like in an opening, the bellows having alternate large and small diameter portions to produce a collapsible accordion effect, and including sleeves projecting from the outer portion of at least one of the large diameter portions, said sleeves being open at their outer ends, filters secured within said sleeves, and means within said sleeves to permit the dislodgement of said filters.

More specifically it is an object to provide a flexible bellows for sealing a reciprocating rod or the like in an opening, the bellows having alternate large and small diameters progressively decreasing in size toward one end thereof, also having orifices in the periphery of at least one large diameter and including an annular filter positioned within said large diameter so as to cover said orifices to allow air from the bellows to escape therethrough and to prevent objectionable foreign matter from entering the bellows.

Another object is to provide a bellows for sealing a reciprocating rod or the like in an opening including air exhaust means therefor and filters associated therewith which is simple in construction, easy to manufacture and efficient in use.

These and other objects, advantages and novel details of construction of this invention will be made more apparent as this description proceeds, especially when considered in connection with the accompanying drawings, wherein.

Figure 1:
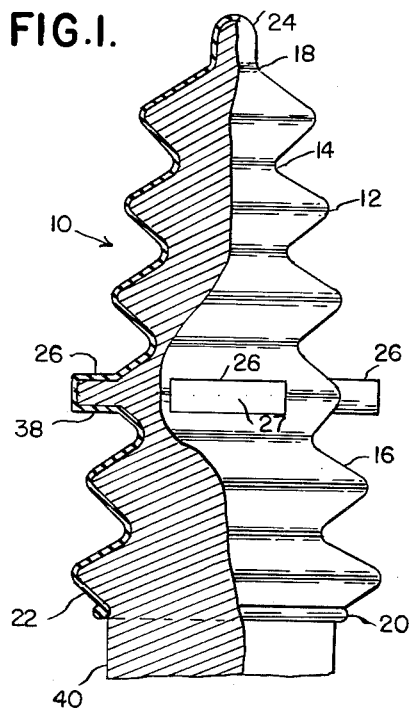
FIGURE 1 is an elevational view of the bellows of the invention as it is formed on a mandrel and which is partly in section to show the mandrel.

One embodiment of a bellows generally indicated 10 and constructed according to the invention is illustrated in FIGURE 1 in which the seal or bellows is shown on the formed mandrel on which it is produced by dipping. The bellows 10 is illustrated in FIGURE 1 in its fully expanded position. As shown the bellows 10 comprises an elongated flexible member having alternate large and small diameter portions 12 and 14 along the length thereof forming adjacent folds or convolutions 16. Also it will be noted that the adjacent convolutions have progressively smaller diameters in the direction of end 18. The bellows 10 is further provided with bead 20 at the end 22 and nipple 24 at end 18. Rectangular nipples or sleeves 26 as shown in FIGURE 1 are also provided in the manufacture of the bellows near the large diameter of one or more convolutions 16.

Figure 2:
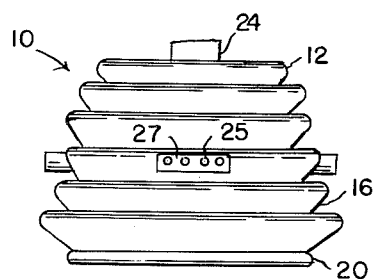
FIGURE 2 is an elevational view of of the bellows of FIGURE 1 in a compressed position after removal from the mandrel and with openings in the end surface of the sleeves.

The bellows 10 is particularly adapted to be attached to a relatively large housing member (not shown) having a reciprocating rod (not shown) extending therefrom. In such installation end 22 of the bellows 10 may be secured to the housing by bead 20 in conjunction with a mating groove on the housing. Alternatively, an expander ring or flange plate may be used to secure the bellows 10 to a housing. The reciprocating rod is passed through end 18 of the bellows and is tightly surrounded by nipple 24 which has had the tip thereof removed as indicated in FIGURE 2 to allow passage of the rod therethrough.

The purpose of a bellows 10 in such an installation is to prevent dust, grit and other matter from passing through the opening in which the rod reciprocates, as for example into the interior of an automobile. A bellows type cover is necessary to follow the reciprocation of the rod, the bellows being expanded as in FIGURE 1 on extension of the rod and collapsed as in FIGURE 2 on retraction of the rod.

In installations such as in connection with power brakes for automobiles the reciprocating action of the rod is often very fast. It is necessary therefore to provide means for allowing air within the bellows to escape during collapse of the bellows and to provide means for allowing air to enter the bellows on expansion thereof. If such means are not provided the bellows will become deformed during reciprocation of the rod retarding the action of the rod and deteriorating quickly. The means for allowing air to pass into and out of the bellows on reciprocation of the rod must not however allow foreign matter such as dust or grit to enter the bellows as this would defeat the purpose of the bellows which is to act as a seal for the opening.

Figure 3:
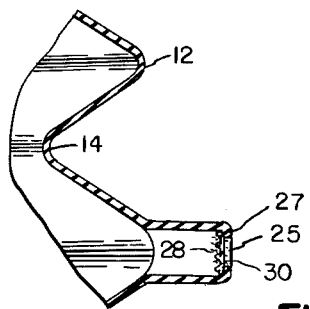
FIGURE 3 is a partial section of the bellows of FIGURE 1 showing one of the rectangular sleeves thereof with openings cut in the end surface thereof and a filter inserted within the sleeve covering the openings.
Figure 4:
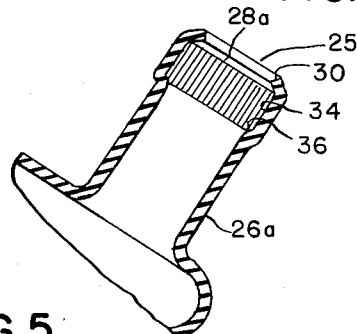
FIGURE 4 is a partial section of a bellows similar to that of FIGURE 1 showing a modified circular sleeve having the tip removed and constructed to positively grip a filter placed therein.

Applicant therefore provides nipples or sleeves 26 on bellows 10 in the manufacture thereof. Before installation of the bellows the openings 25 are cut in the end surface 27 of sleeves 26 providing access to the interior of the bellows 10 from the outside thereof as best shown in FIGURES 3 and 4. Filter elements 28 are then placed in the tips of the hollow sleeve structure 26 as shown in FIGURES 3 and 4 to allow air to pass freely in and out of bellows 10 while filtering the dirt and grit therefrom.

Various filters 28 and methods of securing them within sleeves 26 as well as various shapes and forms for sleeves 26 are contemplated by applicant depending on the requirements therefor in a particular seal application. In FIGURE 3 there is shown a screen type filter 28 having flock bonded thereto to increase the filter action thereof positioned within a rectangular sleeve such as is indicated in FIGURE 1. It will be understood that one or several sleeves 26 may be positioned around a single large diameter of the bellows or the sleeves may be distributed over several large diameters of the bellows. The number and area of the openings 25 in sleeves 26 will of course be determined by the application of the bellows. In general with faster acting rods and with larger bellows the opening area must be increased. Filter 28 may also be bonded to the sleeve 26 with suitable adhesive or may alternatively be held therein through frictional forces. It will also be noted that in the cutting of openings 25 in the surface 27 of sleeves 26 to form the sleeve structure of FIGURE 3 that the surfaces 27 are cut so as to leave an inwardly projecting lip 30 around the edge 32 of the sleeve structure. The lip 30 aids in the retaining of the filter 28 within sleeve 26.

In FIGURE 4 a cigarette type filter is shown secured within a slightly modified sleeve 26a. The sleeve 26a in FIGURE 4 is circular in cross-section and is provided with an internal annular recess 34 formed as shown into which filter 28a may be placed by stretching the lip 30. Filter 28a is therefore secured in place by the mechanical means of abutment 36 and lip 30. The recess 34 in FIGURE 4 may be formed in the manufacture of bellows 10 by providing an annular ring on the sleeve forming projections such as 38 of a mandrel such as 40 shown in FIGURE 1.

Bellows 10 may be produced by a dip process. A mandrel 40 as shown in FIGURE 1 shaped in the form desired of the expanded bellows is dipped into a liquid rubber or other suitable flexible plastic material, held for a time dependent on the thickness of the bellows desired and then withdrawn. The material adhering to the mandrel 40 after setting or curing may be stripped from the mandrel to provide the bellows 10. Openings 25 may then be cut in sleeves 26 as desired for a particular bellows installation. The bellows 10 will be inside out relative to the bellows as shown in FIGURE 1 on being stripped from the mandrel and the sleeves 26 may be extending into the interior thereof. It is then necessary to turn the bellows 10 right side out to produce a bellows as shown in FIGURES 1 and 2 having the sleeves 26 extending outwardly therefrom.

In the manufacture of the bellows 10 it is necessary to have sufficient clearance between the sleeves 26 thereof and the adjacent convolutions 16 to prevent the liquid rubber or other flexible material from bridging across between the sleeve end 27 and the adjacent convolution of the bellows during the dipping process.

In FIGURE 2 there is shown the bellows 10 in its collapsed position. It will be noted that in the collapsed position the convolutions of bellows 10 nest within each other. This nesting of successive convolutions is facilitated by each convolution in applicant's device being made of slightly different diameter from the adjacent ones as previously explained and shown in the figures.

Figure 5:
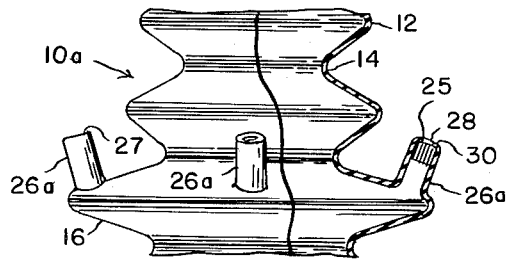
FIGURE 5 is a partial elevation partly in section of a bellows similar to that of FIGURE 1 which includes an extra large diameter portion supporting circular upwardly extending air exhaust sleeves at a point thereon radially outward from the large diameter portions above the sleeves to prevent the sleeves from interfering with the movement of the bellows.

It is contemplated however that in certain installations vertically extending sleeves 26a similar to those shown in FIGURE 4 will be required. Such sleeves on a bellows as shown in FIGURE 1 would interfere with the complete collapse of bellows 10. Such interference may cause excessive wear at contact points between the tips of sleeves 26a and adjacent convolutions 16 of the bellows 10. Therefore to prevent such interference in installations where it is objectionable applicant provides the structure shown in FIGURE 5. In FIGURE 5 the particular convolution 16 of a bellows 10a supporting the sleeves 26a is made of larger diameter than normal as shown so that sleeves 26a do not contact the convolutions of the bellows with the bellows in the collapsed position.

Figure 7:
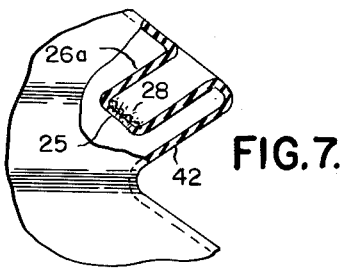
FIGURE 7 is a partial elevation partly in section of a bellows similar to that of FIGURE 5 wherein the sleeves are turned into the bellows as shown and are attached to the bellows at an angle such that no interference between the sleeves and the sides of the bellows results when the sleeves are turned into the bellows.

Also it is considered that it would be desirable to place sleeves 26a inwardly of the bellows in particular installations as shown in FIGURE 7. In such installations it will of course be necessary to produce sleeves 26a with the same angle with respect to the vertical as side 42 of the bellows to which it is attached has in the extended position of the bellows to prevent interference between the sleeves 26a and the side of the bellows.

Figure 6:
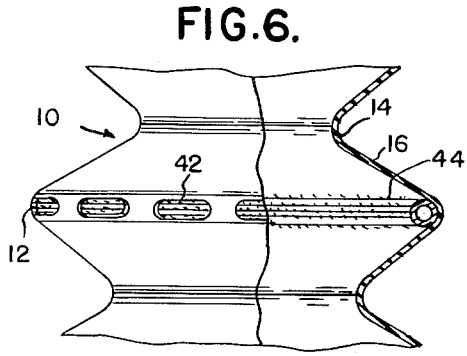
FIGURE 6 is a partial elevation partly in section of a bellows similar to that of FIGURE 1 wherein the sleeves are replaced by circumferential slots in one large diameter portion thereof and an internal filter ring covering the slots is provided within said large diameter portion.

A modification of the invention is shown in FIGURE 6. In FIGURE 6 air inlet and discharge slots 42 are provided around the periphery of at least one of the convolution of bellows 10b An annular filter 44 which may be a screen having flock bonded thereto is positioned within the bellows in registration with the slots 42 to prevent objectionable matter from entering the bellows through slots 42. Alternately the filter may be a spring wire supporting cigarette type filter material or other types of annular filters.

The bellows 10b of the modification may be formed as the bellows 10 of FIGURES 1–2 and 5 but without sleeves 26. The slots 42 may later be cut therein as desired for a particular application. Filters 44 may be placed in bellows 10b after the manufacture thereof and the cutting of slots 42. Alternatively filters 10 may be positioned on mandrel 40 before the dipping process and thereby be bonded into the bellows 10b during the dipping process.

The drawings and the foregoing specification constitute a description of the improved bellows in such full, clear, concise and exact terms as to enable any person skilled in the art to practice the invention, the scope of which is indicated by the appenedd claims.

What I claim as my invention is:

1. A bellows for sealing a reciprocating rod or the like in an opening, comprising an elongated flexible relatively impervious member having alternating large and small diameter portions along the length thereof forming adjacent convolutions, air exhaust and intake means operably associated with said bellows around the outer edge of at least one of said portions of said flexible member to prevent undesirable deformations of said bellows on rapid collapsing and expanding thereof, and filter means relatively pervious with respect to said flexible member operably associated with said air exhaust and intake means to prevent foreign matter from entering said bellows through said air exhaust and intake means.

2. A bellows for sealing a reciprocating rod or the like in an opening, comprising an elongated flexible relatively impervious member having alternating large and small diameter portions along the length thereof forming adjacent convolutions, air intake and exhaust sleeves attached to and positioned around the outer edge of at least one of said convolutions and opening into said bellows to prevent undesirable deformation of said bellows on rapid collapsing and expanding thereof, and filter means relatively pervious with respect to said flexible member operably associated with said sleeves to prevent foreign matter from entering said bellows.

3. A bellows for sealing a reciprocating rod or the like in an opening, comprising an elongated flexible relatively impervious member having alternating large and small diameter portions along the length thereof forming adjacent convolutions, air intake and exhaust sleeves attached to and positioned around the outer edge of at least one of said convolutions and opening into said bellows, said sleeves being positioned to provide clearance between the outer end thereof and the convolutions adjacent thereto, and filter means relatively pervious with respect to said flexible member operably associated with said sleeves to prevent foreign matter from entering said bellows.

4. A bellows for sealing a reciprocating rod or the like in an opening, comprising an elongated flexible relatively impervious member having alternating large and small diameter portions along the length thereof forming adjacent convolutions of varying diameter, one convolution having a diameter larger than either of the convolutions adjacent thereto and having air intake and exhaust sleeves attached thereto and opening into said bellows, said sleeves being positioned around the outer edge of said one convolution so as not to interfere with the adjacent convolutions on collapse of said bellows, and filter means relatively pervious with respect to said flexible member operably associated with said sleeves to prevent foreign matter from entering said bellows.

5. A bellows for sealing a reciprocating rod or the like in an opening, comprising an elongated flexible relatively impervious member having alternating large and small diameter portions about an axis along the length thereof forming adjacent convolutions, rectangular air intake and exhaust sleeves attached to and positioned around the outer edge of at least one of said convolutions at right angles to the axis of the bellows and opening into said bellows, and filter means relatively pervious with respect to said flexible member operably associated with said sleeves to prevent foreign matter from entering said bellows.

6. A bellows for sealing a reciprocating rod or the like in an opening, comprising an elongated flexible relatively impervious member having alternating large and small diameter portions along the length thereof forming adjacent convolutions, cylindrical air intake and exhaust sleeves attached to and positioned around the outer edge of at least one of said convolutions and opening into said bellows, said sleeves having annular recesses on the interior surfaces at the outer ends thereof formed to receive filter means, and filter means relatively pervious with respect to said flexible member positioned within said recesses to prevent foreign matter from entering said bellows.

7. A bellows for sealing a reciprocating rod or the like in an opening, comprising flexible relatively impervious member having alternating large and small diameter portions forming adjacent convolutions, air intake and outlet orifices around the outer periphery of at least one of said adjacent convolutions, and filter means relatively pervious with respect to said flexible member operably associated with said orifices to prevent foreign matter from entering said bellows.

8. A bellows for sealing a reciprocating rod or the like in an opening, comprising an elongated flexible relatively impervious member having alternating large and small diameter portions along the length thereof forming adjacent convolutions, air intake and outlet circumferential slots around the outer periphery of at least one of said adjacent convolutions, and filter means relatively pervious with respect to said flexible member operably associated with said slots to prevent foreign mater from entering said bellows.

9. A bellows for sealing a reciprocating rod or the like in an opening, comprising an elongated flexible relatively impervious member having alternating large and small diameter portions along the length thereof forming adjacent convolutions, air intake and exhaust sleeves attached to and positioned around the outer edge of at least one of said convolutions and opening into said bellows, and cigarette type filter means relatively pervious with respect to said flexible member positioned within said sleeves to prevent foreign matter from entering said bellows.

10. A bellows for sealing a reciprocating rod or the like in an opening, comprising an elongated flexible relatively impervious member having alternating large and small diameter portions along the length thereof forming adjacent convolutions, air intake and exhaust sleeves attached to and positioned around the outer edge of at least one of said convolutions and opening into said bellows, and filters relatively pervious with respect to said flexible member comprisng screens having flock bonded thereto positioned within said sleeves to prevent foreign matter from entering said bellows.

11. A bellows for sealing a reciprocating rod or the like in an opening, comprising an elongated flexible relatively impervious member having alternating large and small diameter portions along the length thereof forming adjacent convolutions, air intake and exhaust sleeves attached to and positioned around the outer edge of at least one of said convolutions and opening into said bellows, and filter means to prevent foreign matter from entering said bellows relatively pervious with respect to said flexible member bonded with said sleeves to prevent said filter means from being dislocated with respect to said sleeves on collapse of said bellows.

12. A bellows for sealing a reciprocating rod or the like in an opening, comprising an elongated flexible relatively impervious member having alternating large and small diameter portions along the length thereof forming adjacent convolutions, at least one of said convolutions having air intake and outlet orifices around the outer periphery thereof, and an annular flocked screen filter relatively pervious with respect to said flexible member positioned on the interior of said bellows in registration with said orifices to prevent foreign matter from entering said bellows.

13. A bellows for sealing a reciprocating rod or the like in an opening comprising an elongated flexible relatively impervious member, air exhaust and intake means operably associated with said flexible member to prevent undesirable deformation of said bellows on rapid collapsing and expanding thereof, and filter means relatively pervious with respect to said flexible member operably associated with said air exhaust and intake means to prevent foreign matter from entering said bellows through said air exhaust and intake means.

14. A bellows for sealing a reciprocating rod or the like in an opening, comprising an elongated flexible relatively impervious member having alternating large and small diameter portions along the length thereof forming adjacent convolutions, at least one of said convolutions having air intake and outlet orifices around the outer periphery thereof, and an annular flocked screen filter relatively pervious with respect to said flexible member positioned in registration with said orifices to prevent foreign matter from entering said bellows.

15. A bellows for sealing a reciprocating rod or the like in an opening, comprising an elongated flexible relatively impervious member having alternating large and small diameter portions along the length thereof forming adjacent convolutions, air intake and exhaust sleeves attached to and positioned around the outer edge of at least one of said convolutions, said sleeves extending inwardly of and opening into said bellows and filter means relatively pervious with respect to said flexible member operably associated with said sleeves to prevent foreign matter from entering said bellows.

16. Structure as set forth in claim 13 wherein said flexible member is provided with an enlarged diameter portion and said filter means is secured within said enlarged diameter portion.

17. Structure as set forth in claim 13 wherein said flexible member has alternating large and small diameter portions, said air exhaust and intake means is an orifice in one of said portions and said filter means is secured in said one portion.

References Cited in the file of this patent

UNITED STATES PATENTS

| | | |
|---|---|---|
| 1,088,954 | Wright | Mar. 3, 1914 |
| 1,324,850 | Roberts | Dec. 16, 1919 |
| 1,561,928 | Jaquith | Nov. 17, 1925 |
| 1,835,770 | Gasner et al. | Dec. 8, 1931 |
| 2,007,501 | Millmine | July 9, 1935 |
| 2,211,817 | Hufferd et al. | Aug. 20, 1940 |
| 2,278,764 | Boyle | Apr. 7, 1942 |
| 2,378,046 | Stergis | June 12, 1945 |
| 2,384,056 | Tritt | Sept. 4, 1945 |
| 2,464,988 | Payne | Mar. 22, 1949 |
| 2,465,546 | Marslek | Mar. 29, 1949 |
| 2,761,694 | Graham | Sept. 4, 1956 |

FOREIGN PATENTS

| | | |
|---|---|---|
| 1,081,076 | France | June 2, 1954 |